(12) United States Patent
Irwin et al.

(10) Patent No.: US 7,168,909 B2
(45) Date of Patent: Jan. 30, 2007

(54) ARTICLE STACKING APPARATUS AND METHOD

(75) Inventors: Jere F. Irwin, P.O. Box 10668, Yakima, WA (US) 98909-1668; Dale L. Vantrease, Selah, WA (US); Cole E. Orcutt, Yakima, WA (US)

(73) Assignee: Jere F. Irwin, Yakima, WA (US)

( * ) Notice: Subject to any disclaimer, the term of this patent is extended or adjusted under 35 U.S.C. 154(b) by 0 days.

(21) Appl. No.: 10/701,700

(22) Filed: Nov. 4, 2003

(65) Prior Publication Data

US 2005/0095113 A1 May 5, 2005

(51) Int. Cl.
  B65B 35/50 (2006.01)
  B65G 47/12 (2006.01)
  B65G 33/12 (2006.01)

(52) U.S. Cl. ............... 414/788.2; 414/788.3; 198/443; 198/658

(58) Field of Classification Search ............. 414/788.2, 414/788.3; 198/443, 658, 382, 396; 193/10
  See application file for complete search history.

(56) References Cited

U.S. PATENT DOCUMENTS

| 2,270,187 A | 1/1942 | Dulmage | 18/19 |
|---|---|---|---|
| 2,849,099 A * | 8/1958 | Halahan et al. | 198/392 |
| 2,879,919 A * | 3/1959 | Knoche | 221/277 |
| 3,640,666 A | 2/1972 | Jope et al. | 425/302 |
| 4,755,129 A | 7/1988 | Baker et al. | 425/292 |
| 4,984,678 A * | 1/1991 | Fauchard | 198/443 |
| 5,353,914 A * | 10/1994 | Stephen et al. | 198/443 |
| 6,006,891 A * | 12/1999 | Iwano et al. | 198/417 |
| 6,564,925 B1 * | 5/2003 | Cadwallader et al. | 198/443 |
| 6,884,016 B2 * | 4/2005 | Ogle et al. | 414/272 |
| 6,903,279 B2 * | 6/2005 | Taylor | 177/25.18 |

\* cited by examiner

*Primary Examiner*—Eileen D. Lillis
*Assistant Examiner*—Gregory Adams
(74) *Attorney, Agent, or Firm*—Wells St. John P.S.

(57) ABSTRACT

An article stacking apparatus is provided having a barrel, a frame, a motor, and a drive mechanism. The frame is configured to support the barrel for rotation in a recumbent position. The drive mechanism couples together the frame and the motor to rotate the barrel to agitate cups within the barrel for stacking into accumulated configurations. A method is also provided.

25 Claims, 10 Drawing Sheets

ARTICLE STACKING APPARATUS AND METHOD

TECHNICAL FIELD

This invention pertains to the processing of stackable articles. More particularly, the present invention relates to apparatus and methods for collecting and stacking thermoformed articles that have a mouth opening and a tapered body suitable for internesting with an adjacent article.

BACKGROUND OF THE INVENTION

In the past, thermoformed plastic articles, such as plastic cups generated from a thermoforming line, were stacked by hand as the articles were ejected into a bin from a trim press. At some subsequent point in time, a shaking box was operated by hand to stack the plastic cups. More particularly, an operator loaded plastic cups into the shaking box, after which the operator shook the box to agitate the cups, causing the cups to internest as the relatively narrow, tapered bottom ends tended to nestle into the wider, open-mouthed top ends as a result of the shaking. It was further discovered that, if the height of such a tapered cup was greater than a maximum diameter of such cup, shaking or jiggling of the box would stack the cups together. It was further found that dumping the partially stacked cups from one box into another box further encouraged stacking as the another box was further agitated or shaken. However, the shaking of one or more boxes by hand was found to be relatively inefficient, and tiring for the operator. Furthermore, as an operator becomes tired, it becomes difficult to continue generating sufficient shaking or agitation of the cups. Even furthermore, the number of cups that can be agitated at one time is limited by the strength of the operator and the size of box that the operator can carry and shake as bulk and weight limit the operator's performance when stacking cups.

SUMMARY OF THE INVENTION

An apparatus and method are provided for agitating open mouthed articles to encourage nesting together of such articles into a stack. Pivotal motion of a concave surface encourages stacking of articles that taper in diameter from an open top to a narrow base. Placement of projections on the concave surface further encourage agitation of the articles which, in some cases, further encourages stacking of the articles. In one case, the concave surface is provided by an inner surface of a drum and projections are provided by a helical array of rods provided on the inner surface.

According to one aspect, an article stacking apparatus is provided having a barrel, a frame, a motor, and a drive mechanism. The frame is configured to support the barrel for rotation in a recumbent position. The drive mechanism couples together the frame and the motor to rotate the barrel to agitate cups within the barrel for stacking into accumulated configurations.

According to another aspect, a cup stacking device includes a bin, a frame, a motor, and a drive mechanism. The bin has a concave portion configured to support cups. The frame is configured to support the bin in a recumbent position for pivotal motion of the concave portion. The drive mechanism couples together the frame and the motor to pivot the bin to manipulate orientation of the cups within the bin to stack the cups.

According to yet another aspect, a method is provided for stacking articles. The method includes: providing a recumbent drum; delivering stackable, open-mouthed articles into the drum; and pivoting the drum so as to present the articles along a rolling inner surface of the drum to encourage stacking of the articles.

According to yet a further aspect, a method is provided for stacking open-mouthed articles. The method includes providing a reclining barrel; accumulating open-mouthed articles in the barrel; and rotating the barrel to manipulate orientation of the articles to stack the articles.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
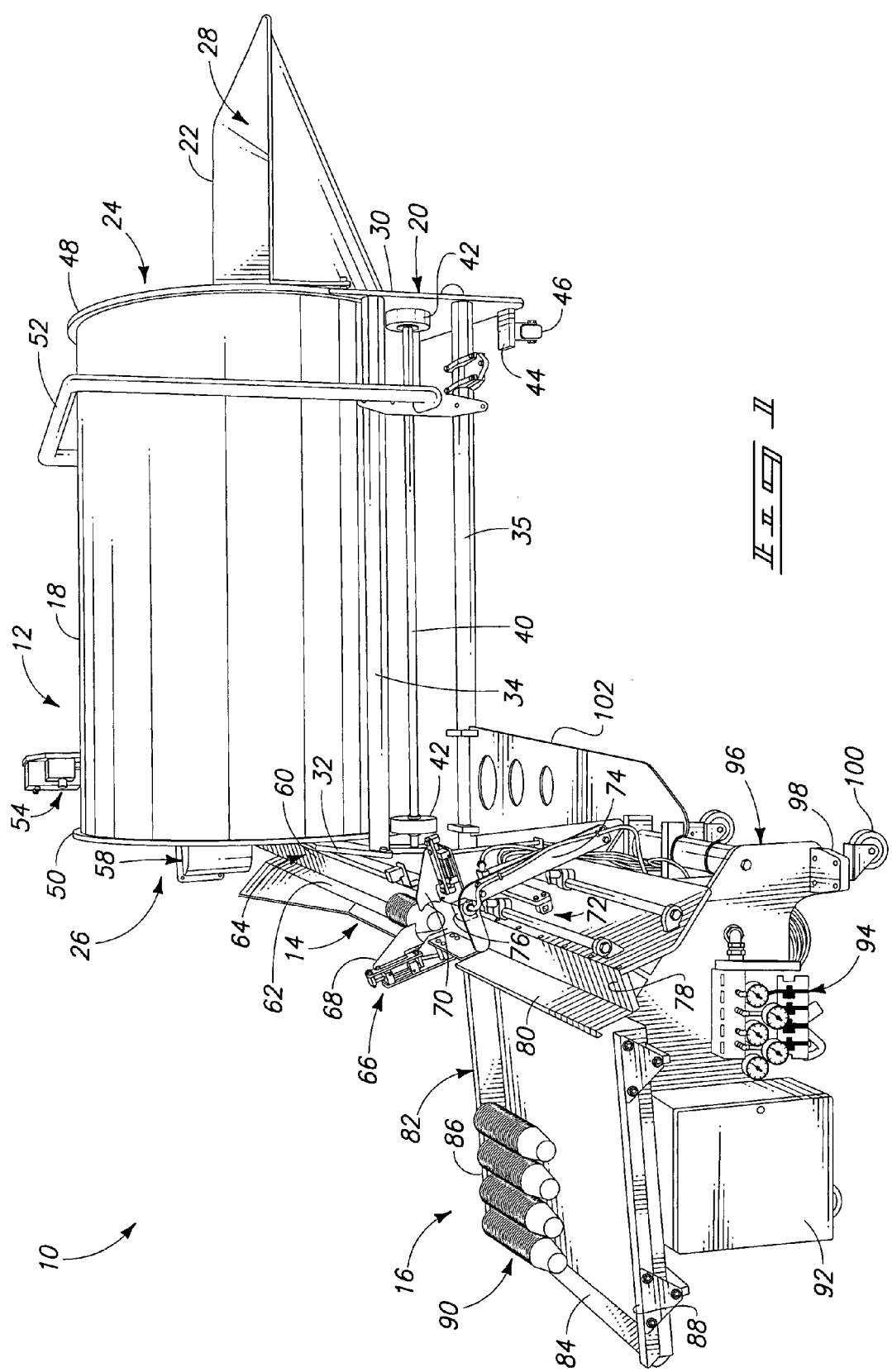
FIG. 1 is a simplified perspective view taken along a right side of an article stacking and collecting system including an article stacking apparatus, an article conveyor, and an article stack collection device according to one aspect of the present invention.

This disclosure of the invention is submitted in furtherance of the constitutional purposes of the U.S. Patent Laws "to promote the progress of science and useful arts" (Article 1, Section 8).

Reference will now be made to a preferred embodiment of Applicant's invention. An exemplary implementation is described below and depicted with reference to the drawings comprising an article stacking device. While the invention is described by way of a preferred embodiment, it is understood that the description is not intended to limit the invention to such embodiment, but is intended to cover alternatives, equivalents, and modifications which may be broader than the embodiment, but which are included within the scope of the appended claims.

In an effort to prevent obscuring the invention at hand, only details germane to implementing the invention will be described in great detail, with presently understood peripheral details being incorporated by reference, as needed, as being presently understood in the art.

According to a preferred embodiment of the present invention, an article stacking apparatus is generally designated with reference numeral 12 in FIGS. 1–11. Article stacking apparatus, or device, 12 is provided within an article stacking and collecting system 10 along with an article conveyor 14 and an article stack collection device 16. A barrel (or drum) 18 of apparatus 12 is supported for rotation atop a frame 20, with an entrance chute 22 provided downstream and adjacent an article trim press of a thermoforming line so as to catch articles as they are ejected or blown from the trim press into entrance chute 22 of apparatus 12, at entrance end 24. As barrel 18 is rotated, individual articles are physically rotated and agitated to encourage nesting together of the articles into stacks. The stacks (and articles) are driven from entrance end 24 and towards an exit end 26 due to a helical orientation of projections, or rods 104 within barrel 18. In one case, the articles comprise plastic cups having an open top (or mouth), a relatively narrow bottom, and a tapered, frustoconical side wall.

Apparatus 12 includes a mouth opening 28, provided by entrance chute 22 at entrance end 24, and configured to catch plastic cups as they are ejected, or blown from a trim press, after being trimmed from a sheet or web of thermoformed plastic material. Details of several combination thermoforming and trim press machines are provided in U.S. Pat. Nos. 4,755,129; 3,640,666; and 2,270,187, herein incorporated by reference. Apparatus 12 can also be used with a thermoforming line that has a separate thermoforming machine and trim press.

To support drum 18 for rotation, frame 20 includes a pair of end plates 30 and 32 that are joined together via fasteners using cross-members 34–37. A drive shaft 38 and an idler shaft 40 support drum 18 atop frame 20 for rotation. A pair of ultra high molecular weight (UHMW) polyethylene wheels are provided, one on each end, on both shafts 38 and 40.

Apparatus 12 is supported for movement along a shop floor by way of four cylindrical wheels 42 that are each supported at one of four corners via a respective leg 44 mounted to frame 20. Furthermore, collection device 16 is supported for movement via wheels 100.

According to one construction, barrel 18 is 0.97 meters in diameter and 1.52 meters in length. Barrel 18 is formed from a cylinder of sheet metal (or sheet steel), having a cylindrical steel flange 48 and 50 welded at respective entrance and exit ends 24 and 26, as shown in FIG. 1. Barrel flanges 48 and 50 serve to enforce respective open entrance end 24 and exit end 26 of barrel 18 in order to impart sufficient hoop strength to barrel 18. According to one construction, flanges 48 and 50 are each formed from a plurality of arcuate segments of steel rod having a rectangular cross-section. The segments are edge welded to a cylindrical steel section along either end to form barrel 18.

As shown in FIGS. 1–6, article stacking device 12 includes a guard 52 mounted adjacent entrance 24. More particularly, guard 52 is formed from a section of tubular pipe which mounts via flanges and fasteners to cross-members 34–37. Guard 52 provides a rectangular guard member that mates with a complementary opening in a cage that surrounds a combination thermoforming machine and trim press (not shown). In this manner, entrance end 24 of stacking device 12 is inserted within the cage for the combination thermoforming machine and trim press up to the point where guard 52 is provided. Guard 52 cooperates with the cage to prevent an operator from positioning their hands anywhere adjacent to the thermoforming machine and trim press.

Figure 6:
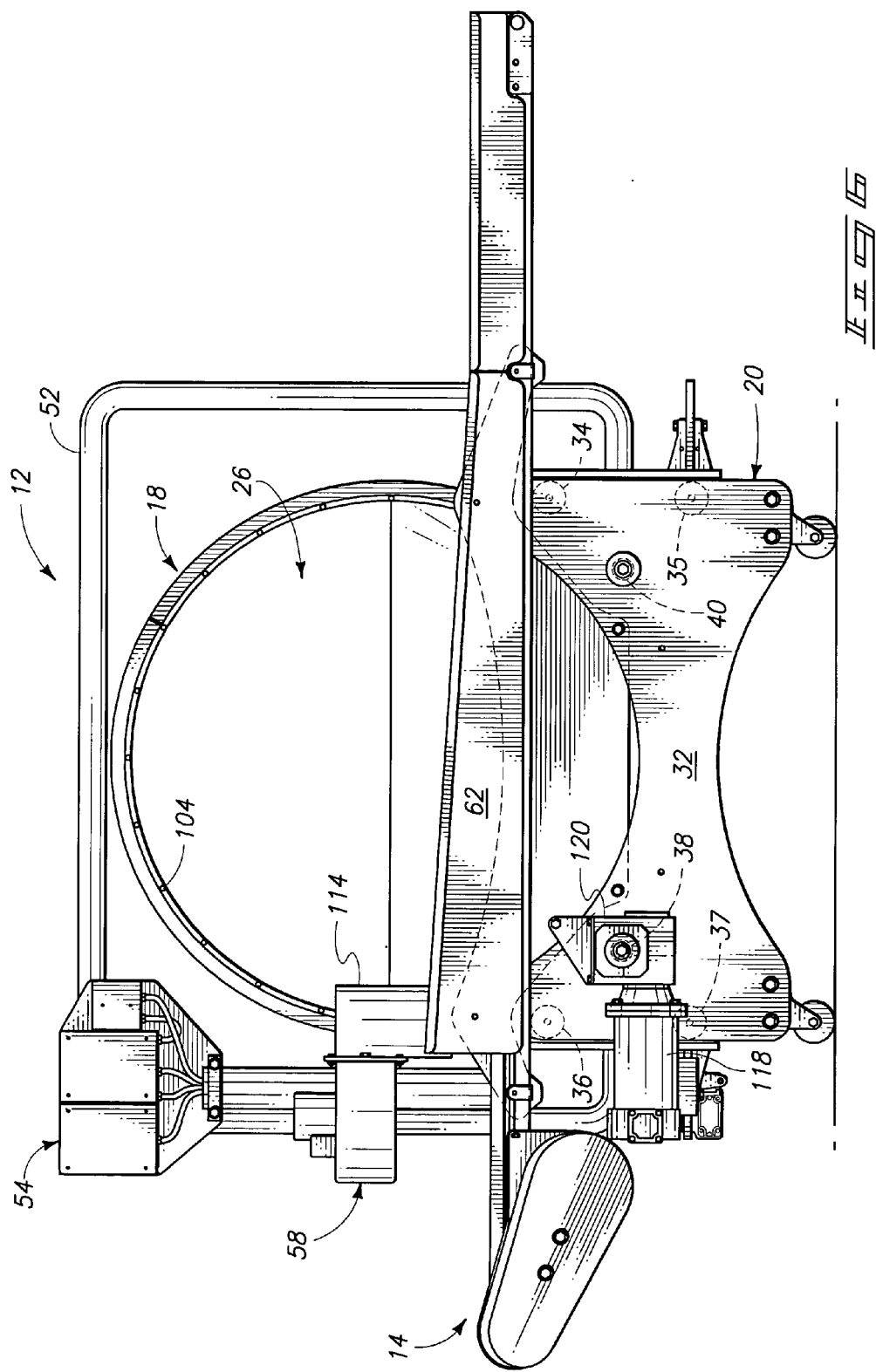
FIG. 6 is a simplified exit end view of the article stacking device of FIGS. 1–5, taken from the left side of FIG. 5.
Figure 7:
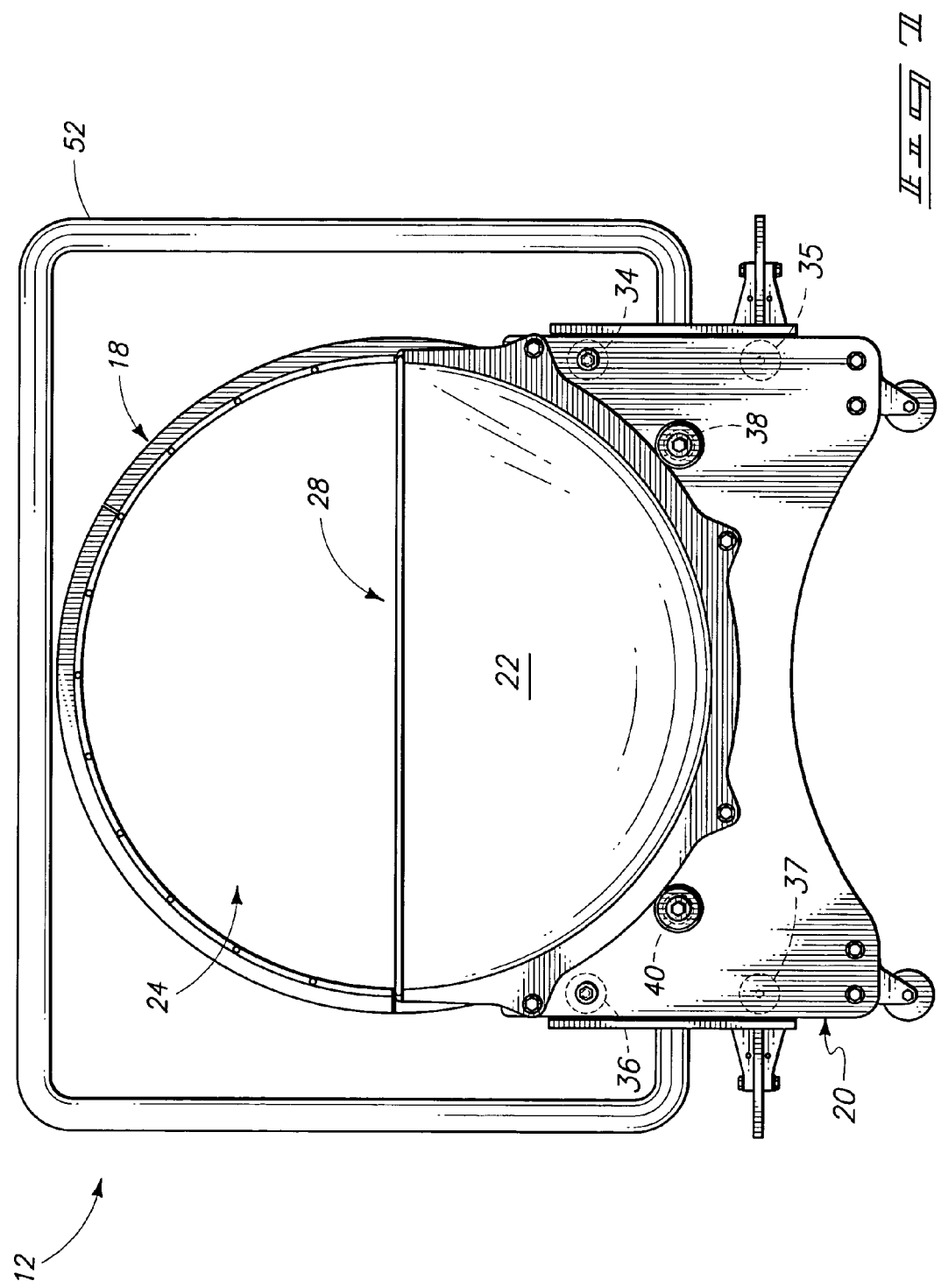
FIG. 7 is a simplified entrance end view of the article stacking device of FIGS. 1–6, taken from the right side of FIG. 5.

Stacking device 12 also includes an array of electrical control boxes 54 that are affixed atop a tubular post through which electrical cables are run for various motors and components associated with stacking device 12. As shown in FIG. 6, the array 54 of control boxes comprises three separate control boxes that are supported atop post 56. Electrical cabling from such control boxes is received through post 56 for delivery at a downstream end to various motors and electrical components used to operate stacking device 12. One of the control boxes comprises an on/off button.

Figure 2:
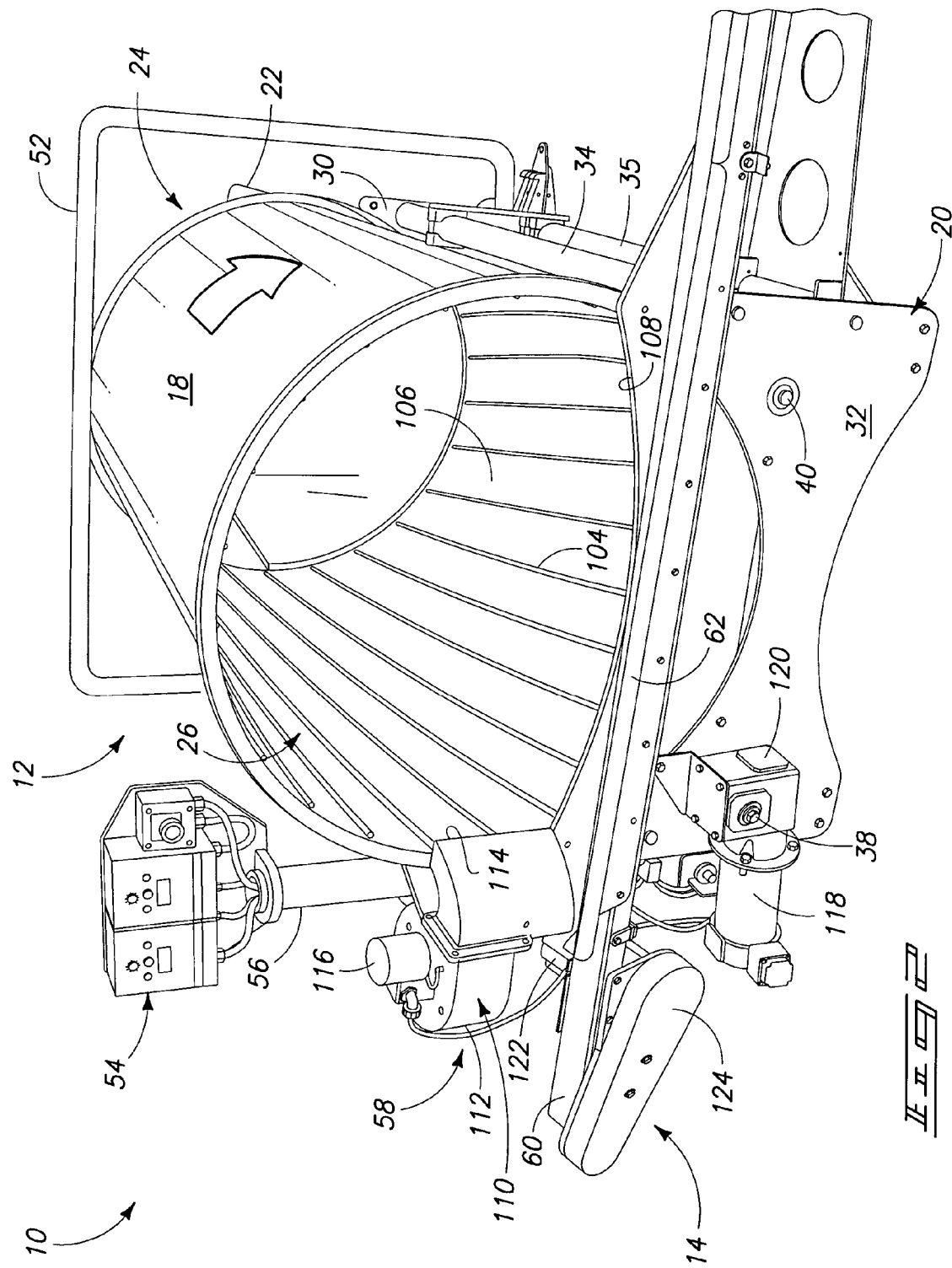
FIG. 2 is a simplified perspective view taken along a front direction of the article stacking apparatus and conveyor of FIG. 1.
Figure 3:
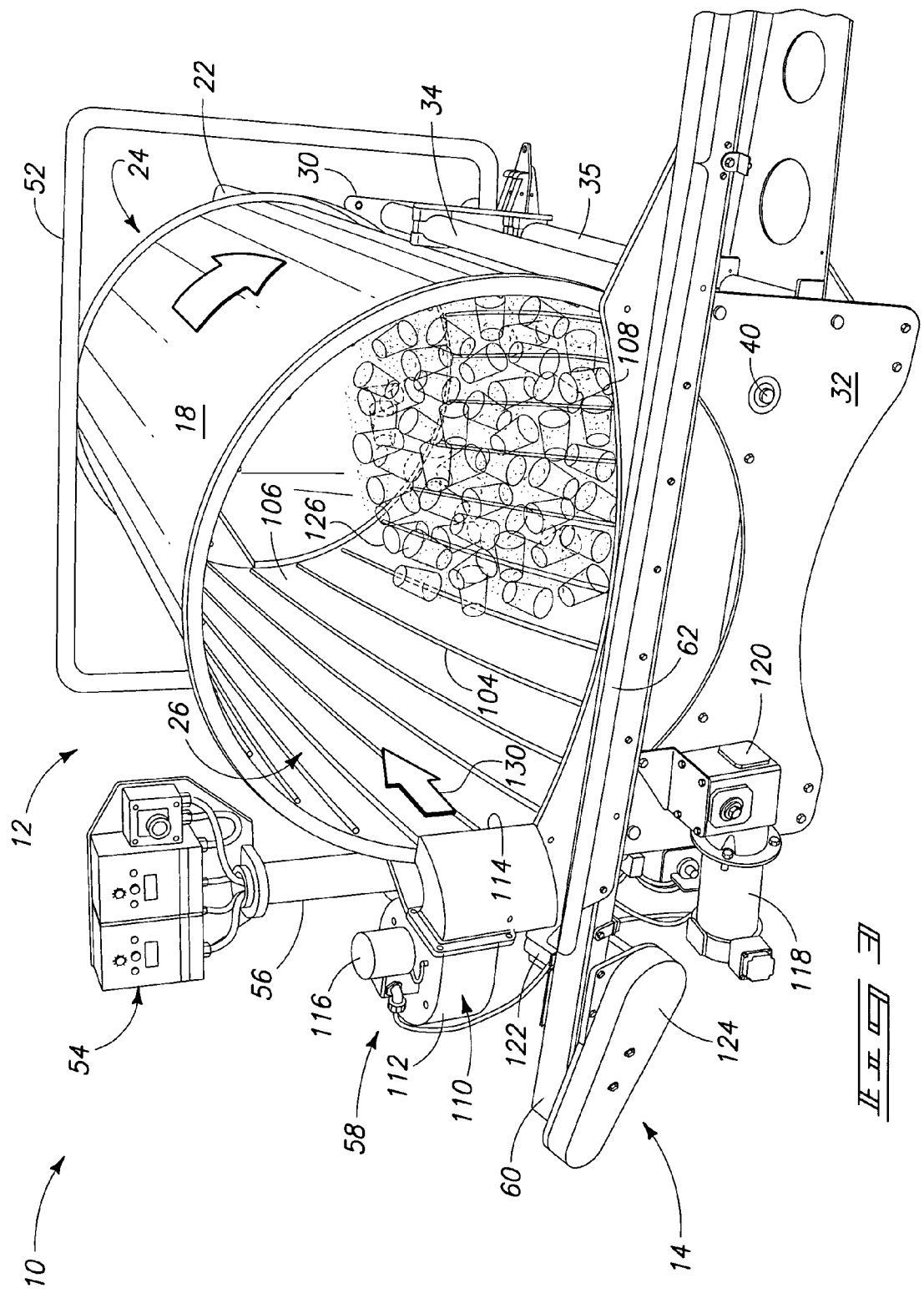
FIG. 3 is a simplified perspective view according to FIG. 2, but illustrating plastic cups that have been ejected into a barrel of the article stacking apparatus for tumbling during rotation of the barrel to stack the cups into nested arrays.
Figure 4:
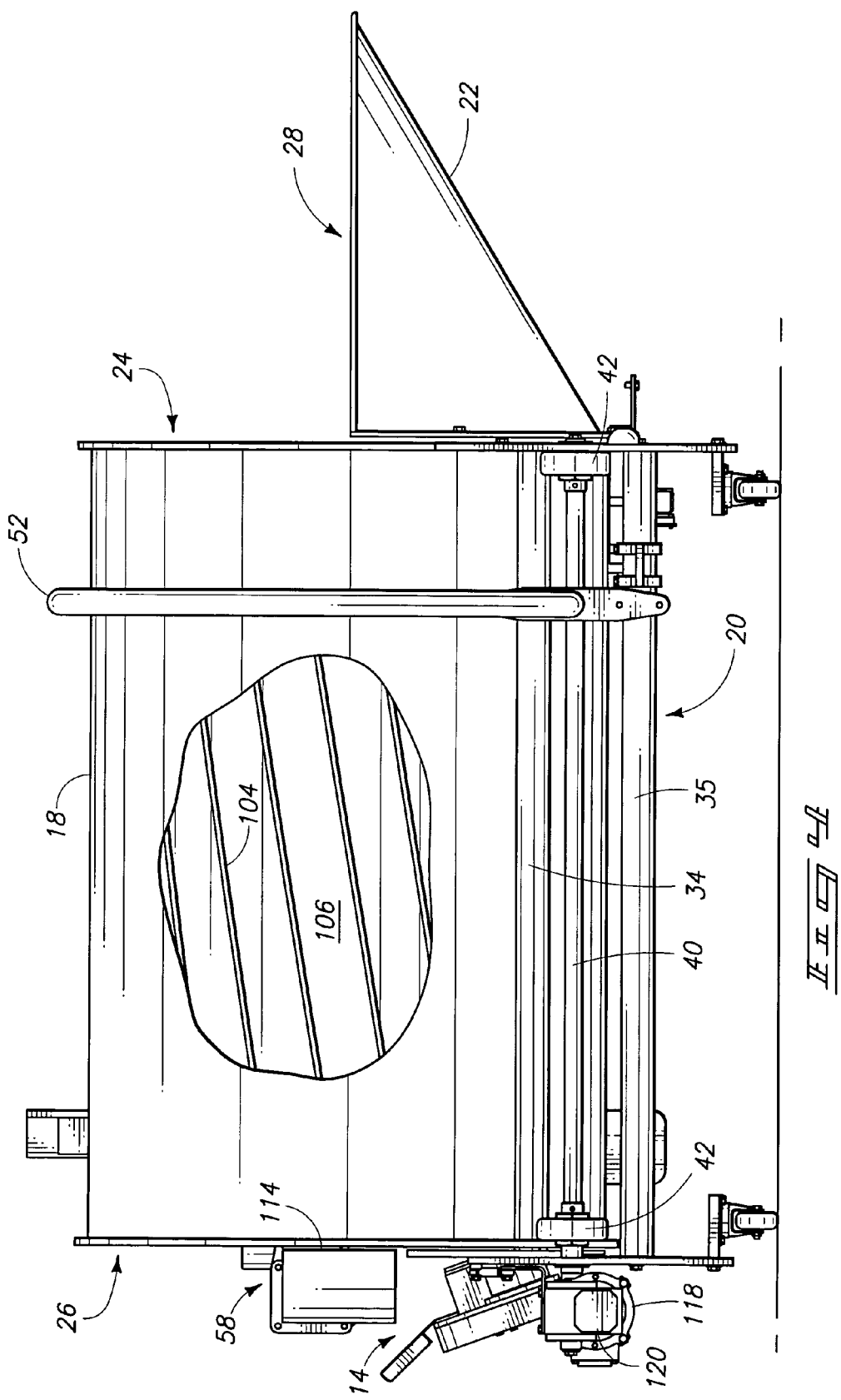
FIG. 4 is a simplified right side view of the article stacking device of FIGS. 1–3 in partial breakaway view illustrating the positioning and orientation of protuberances, or rods, within the barrel to agitate and convey the plastic cups during rotation of the barrel.

As shown in FIG. 3, barrel 18 is rotated in a clockwise direction through activation of motor 118 in response to controls that are generated by the array of control boxes 54 on post 56. Individual steel agitator rods 104 within barrel 18 agitate and shake an array of cup-shaped articles 126 within rotating barrel 18. Articles 126 are delivered into entrance end 24 of barrel 18 (via entrance chute 22) from a thermforming machine and trim press. The randomly configured array of articles 126 are agitated as they bump against agitator rods 104 which encourages the articles to internest. The helical nature of rods 104 further encourages the driving of the internested stacks of articles 126 (and also single articles 126) to be driven in a direction from entrance end 24 towards exit end 26. Accordingly, an operator stands near exit end 26 and retrieves stacks of articles 126 for placement onto a conveyor belt 60. In one case, rods 104 are formed from ⅜" steel rod that is intermittently spot welded to inner surface 106 of barrel 18 (see FIG. 2).

As shown in the construction depicted in FIGS. 1–7 and 11, barrel 18 is supported for rotation in a recumbent position having a horizontal central axis. However, it is understood that the barrel can more generically be in a reclined position where the central axis is either horizontal or inclined from horizontal. For example, one alternative construction elevates the entrance end relative to the exit end by tilting the central axis of barrel 18 in the range of 5–15 degrees. Further alternative constructions are also envisioned. For the case where the entrance end is elevated relative to the exit end, the helical array of the rods within the barrel cooperate with the inclination angle to migrate articles toward the exit end of the barrel.

In order to further enhance the collection of stacks of articles 126 adjacent exit end 26 and to separate unstacked articles 126 adjacent entrance end 24, a pneumatic conveyor 58 is provided adjacent exit end 26. More particularly, pneumatic conveyor 58 delivers a stream of air that tends to entrain and move individual articles (e.g., cups) 126 from the exit end 26 toward the entrance end 24. Such delivery of an air stream tends to drive back individual articles 126 (as well as smaller stacks of articles) for further agitating and stacking within barrel 18. By properly adjusting the rate and velocity of air flow from pneumatic conveyor 58 in relation to the size and weight of an individual article 126, it has been found that stacks of articles 126 tend to accumulate adjacent the exit end 26. In contrast, individual, unsorted articles tend to accumulate near entrance end 24 (due in part to conveyor 58) for further agitating and stacking via coaction with an inner surface 106 of barrel 18, as well as with agitator rods 104. In a similar manner, smaller stacks of articles tend to be moved toward entrance end 24 for further stacking.

In order to facilitate removal of stacks of articles 126 from barrel 18, article conveyor 14 is placed adjacent exit end 26 of stacking device 12. Article conveyor 14 includes conveyor belt 60 which is tensioned across a plurality of rollers, over a bearing surface, and is driven by a belt drive 124. As shown in FIGS. 1–3, article conveyor 14 includes an article wall 62 and an article platform 64. Conveyor belt 60 extends along article platform 64 to deliver stacks of articles from exit end 26 of stacking device 12 toward collection device 16.

As shown in FIG. 1, article platform 16 is slightly tilted perpendicular to the direction of travel so that stacks of articles are biased in engagement against article wall 62. Preferably, article wall 62 is perpendicular to article platform 64, as shown in FIG. 1. As shown in FIG. 2, a drive motor 122 drives belt 60 by way of belt drive 124, preferably at a constant operating speed, to deliver stacks of articles that are hand-placed by an operator onto article wall 62, atop belt 60. Accordingly, an operator stands adjacent exit end 26 and retrieves stacks of articles 126 that accumulate adjacent exit end 26 via coaction with rods 104 and cylindrical inner surface 106 as barrel 18 is rotated in a clockwise direction, as viewed in FIG. 3.

As shown in FIG. 1, conveyor belt 60 extends along and above the length of article platform 64, but terminates prior to a pneumatic article separator assembly 66. Pneumatic article separator assembly 66 includes a pair of pneumatic article separators 68 and 70. A pair of transition guides (not shown) collect a stack of articles that leave the downstream end of belt 60. The stacks of articles are then deposited from the transition guides onto a downstream article platform 78.

An L-shaped arm 74 is positioned at adjustable axial positions along platform 78 where arm 74 is clamped into a desired position along a pair of guide rods. Arm 74 is positioned at a desired location along such guide rods, relative to article separator 68 and 70 in order to define a desired length of a stack of articles. As an operator empties one or more stacks of articles from drum 18 onto conveyor 14, conveyor belt 60 delivers such stack(s) of articles until their presence is engaged by an article detector 72 on arm 74.

Upon detection of articles via detector (or sensor) 76, pneumatic article separator 68 is moved downwardly in a substantially vertical direction to engage between an adjacent pair of cups and to define a length of the stack. Likewise, article separator 70 is concurrently delivered pneumatically toward the stack of articles by drawing article separator 70 in a leftward direction, as viewed in FIG. 1, until article separator 70 nests between the same pair of adjacent cups. Subsequently, arm 74 is driven via a pneumatic cylinder to raise arm 74 elevationally to a vertical position above a trajectory line for the stack of cups. Subsequently, pneumatic article separator 70 is driven in an axial direction via a pneumatic piston in a downstream direction along platform 78, thereby driving the separated stack of articles downstream along platform 78 and adjacent a raised drop-away wall 80. Drop-away wall 80 is then dropped using a pneumatic cylinder to a lowered position which enables the separated stack of articles to roll downwardly along collection tray 82 until they nest against an adjacent stack 90 of articles.

Collection tray 82 is formed from stainless steel sheet metal and includes an end wall 84, a pair of side walls 86 and 88, and drop-away wall 80. From tray 82, stacks 90 can be removed and loaded into plastic bags or boxes.

As shown in FIG. 1, arm 74 includes an article detector 70 comprising an optical proximity sensor 76. Sensor 76 is carried on a right-angle leg portion of arm 74 at a location that detects the presence of a cup between sensor 76 and wall 80. One such suitable sensor comprises a photoelectric sensor configured to detect an object or change when an article is positioned between sensor 76 and wall 80. More particularly, one form of photoelectric sensor is provided by an Allen-Bradley photoelectric sensor Model No. 42EF-S1MPA-F4 comprising a retroreflective photoelectric sensor, sold under the Allen-Bradley name by Rockwell Automation, a division of Emerson Power, of Milwaukee, Wis. Another sensor comprises an optical position displacement sensor. Yet another sensor comprises a proximity detector using polarized light. Further optionally, sensor 76 can comprise a light emitter and a detector that detects interruption of an emitted and reflected light beam due to the presence of an article between sensor 76 and wall 80.

Article stack collection device 16 also includes a control box 90 in which computer and electronic control systems are provided for controlling actuation of pneumatic article separator assembly 66, article detector 72, and drop-away wall 80. Additionally, article stack collection device 16 includes a pneumatic manifold 94 for delivering a supply of air to the respective pneumatic actuators associated with article separators 68 and 70 of separator assembly 66, arm 74, and drop-away wall 80.

Article stack collection device 16 is supported on a frame 96 that has a plurality of legs 98, each with a wheel 100. Wheels 46 and 100 facilitate movement of system 10 within a shop or production facility for a thermoforming operation. To further stabilize and fasten together collection device 16 relative to stacking device 12, a lateral cross-member 102 is mounted between cross-member 35 of stacking device 12 and frame 96 of collection device 16.

As shown in FIGS. 2 and 3, an exit plate 108 is provided along exit end 26 of barrel 18 in order to reduce the tendency of individual, unstacked articles to cascade onto conveyor belt 60. However, it has been found through testing that stacks of articles will still accumulate against the back side of exit plate 108, and some stacks of articles will cascade down onto exit plate 108, adjacent pneumatic conveyor 58. An operator merely needs to ensure the stacks are oriented in a proper direction, or reorient them by hand onto conveyor belt 60. The arcuate shape of exit plate 108 presents a lowered topmost edge along a midsection of exit plate 108 which provides increased clearance room for an operator who is retrieving stacks of articles from within exit end 26 of barrel 18. It is at exit end 26 where such articles tend to accumulate in stacked configurations.

In order to further encourage the accumulation of stacked articles adjacent to exit end 26 of barrel 18, pneumatic conveyor 58 is operated to deliver a stream of air 130 at relatively high velocity in a direction from exit end 26 toward entrance end 24. It has been found that individual articles (which are less densely packed than stacked articles) tend to accumulate atop the stacked articles. The presentment of stream of air 130 within barrel 18 tends to entrain and move the unstacked articles (as well as relatively small stacks of articles) towards the entrance end 24 for further agitation and resultant stacking. Hence, pneumatic conveyor 58 is operative to move unstacked and minimally stacked articles away from exit end 26, whereas the rotary action of rods 104 in barrel 18 also serves to encourage the accumulation of stacked articles toward and adjacent exit end 26.

More particularly, pneumatic conveyor 58 includes a centrifugal fan 110 that is driven in rotation within a fan housing 112 by an electric motor 116. Air is drawn from a center location beneath fan housing 112 and exits housing 112 at a relatively high velocity by way of a right angle duct 114 that has a plenum and slotted outlet nozzle configured to deliver a high-speed stream of air 130 into a desired location within barrel 18. The stream of air 130 entrains, or pushes, individual articles to move such articles toward entrance end 24.

As shown in FIG. 3, articles 126 have been ejected into upstream end 24 of barrel 18 from a combination thermoforming machine and trim press (not shown). More particularly, such articles are ejected from a combination thermoforming machine and trim press machine using pneumatic nozzles configured to blow the cups into entrance chute 22 and barrel 18 for tumbling and stacking therein. However, articles can also be delivered into barrel 18 by a conveyor belt, by hand feeding, or by unloading them from boxes, bins, hoppers, or containers. Further details of such stacking and accumulation will be described below in greater detail with reference to FIG. 11.

Figure 5:
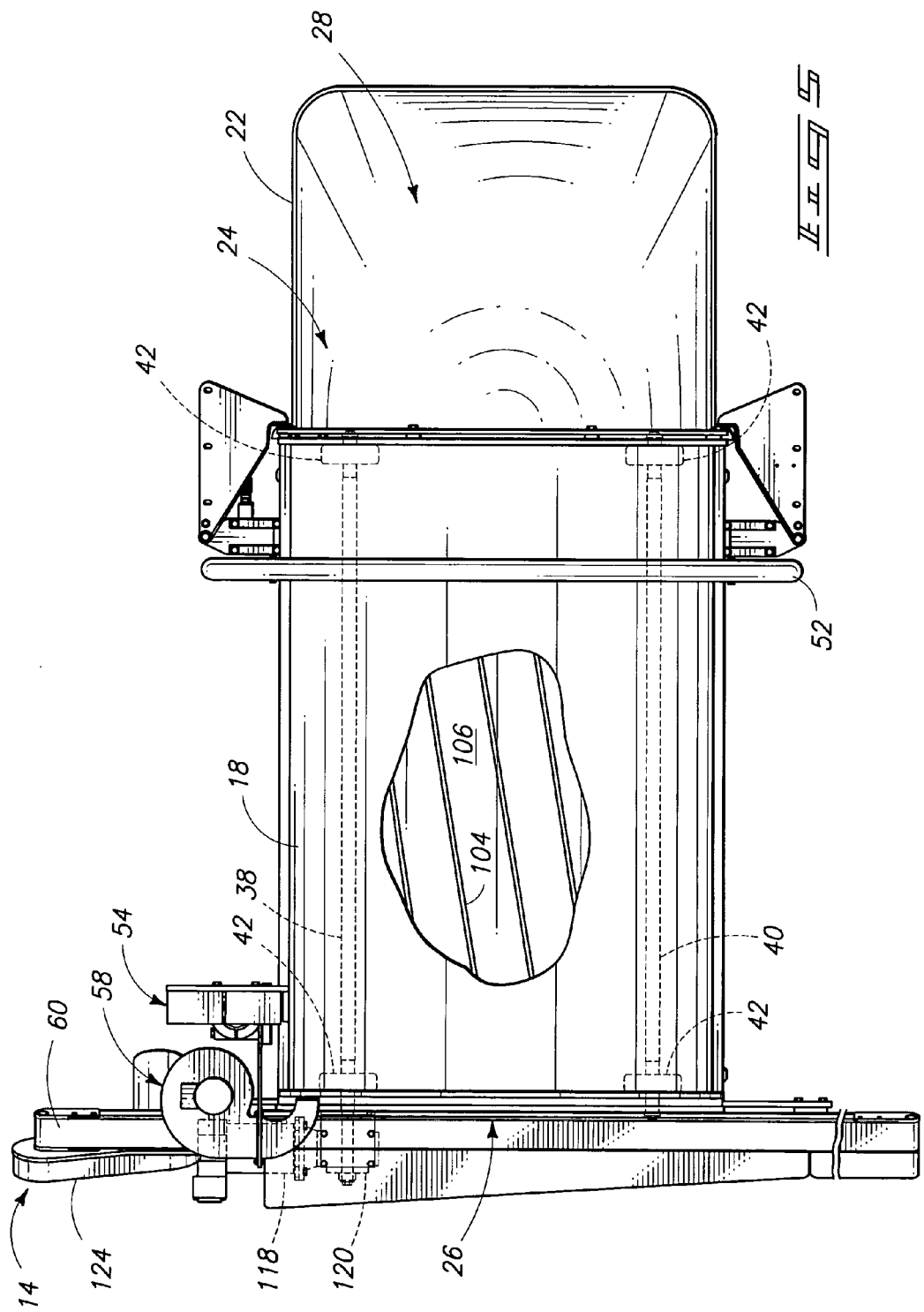
FIG. 5 is a simplified plan view of the article stacking device of FIGS. 1–4 in partial breakaway view further illustrating positioning and orientation of the rods.

As shown variously in FIGS. 1–7, barrel 18 is supported for rotation atop four wheels 42; wherein a first set of wheels is provided spaced apart along drive shaft 38 (see FIGS. 5, 9, and 10) and a second set of wheels 42 is provided spaced apart along idler shaft 40 (see FIGS. 1 and 5). Each pair of wheels 42 on shafts 38 and 40 is spaced sufficiently far enough apart to also longitudinally retain barrel 18 thereatop. More particularly, the outermost edges of each wheel in a pair are spaced immediately adjacent flanges 48 and 50, respectively, which serves to retain barrel 18 from moving in a longitudinal direction atop frame 20, as shown in FIG. 1 with reference to idler shaft 40.

As shown in FIG. 5, drive shaft 38 is similar to idler shaft 40. However, drive shaft 38 is longer at the exit end 26 of drum 18 such that drive shaft 38 extends beyond drum 18, as shown in FIG. 5. Drive shaft 38 is lengthened at this end in order to facilitate securement of drive shaft 38 to transfer case 120 using a threaded bolt that is received within a complementary threaded bore at the exit end of drive shaft 38. In this manner, drive shaft 38 is rigidly affixed to a worm gear in transfer case 120 so that drive shaft 38 is driven in rotation by a complementary worm gear. Such a complementary, intermeshing worm gear in transfer case 120 is coupled to motor 118, as shown in FIG. 6. Transfer case 120 cooperates with motor 118 to drive barrel 18 in rotation to agitate articles in barrel 18 so as to encourage stacking of the articles.

In operation, motor 118 drives gears in transfer case 120 in a manner that rotates drive shaft 38 so as to impart clockwise rotation of barrel 18 as shown in FIGS. 2 and 3. Furthermore, individual wheels 48 are rigidly secured onto drive shaft 38 to prevent relative rotation between shaft 38 and wheels 48 such that rotational motion of drive shaft 38 imparts concurrent rotation of wheels 42 sufficient to cause barrel 18 to rotate in a clockwise direction, as viewed in FIG. 2. Hence, drive shaft 38 and wheels 42 are driven in a direction opposite to the clockwise rotation of barrel 18, as viewed in FIG. 2.

According to one construction, motors 118 and 122 each comprise a Baldor DC motor, Model No. CDP3310, sold by Baldor Electric Company, of Ft. Smith, Ark. Also according to one construction, transfer case 120 comprises a Browning Model No. 175Q56H15 worm gear reducer, or gear box. Similar gear boxes are also sold under the brand names Morse, Raider and Cobra, which are separate divisions of Emerson Power Transmission, of St. Louis, Mo. Also according to one construction, pneumatic conveyor 26 comprises a Dayton Model No. 4C447 electric turbine fan sold by Dayton Electric Manufacturing of Lake Forest, Ill. However, it is understood that other components can be substituted for the above-identified exemplary components.

Figure 8:
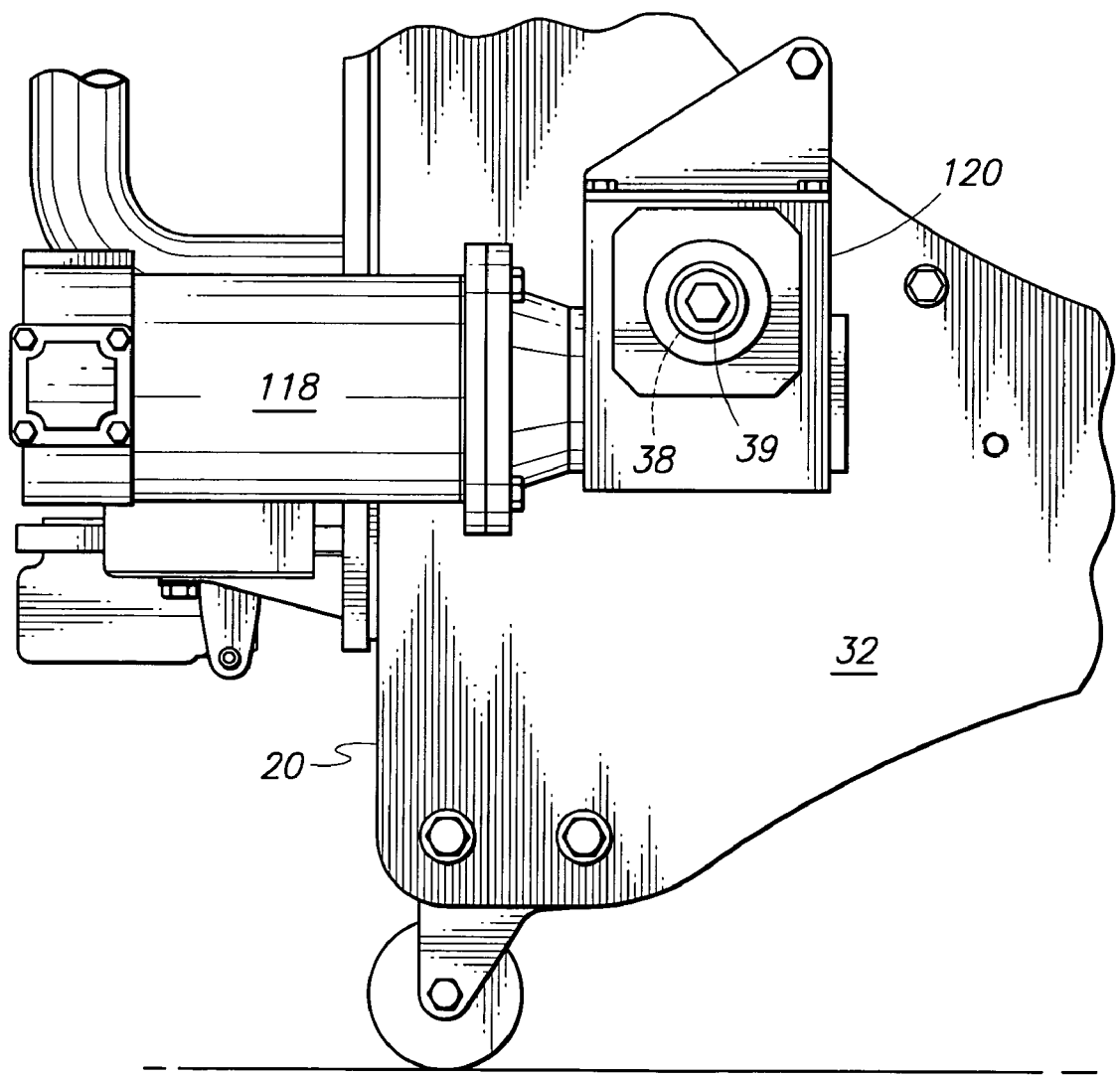
FIG. 8 is an enlarged partial view taken from FIG. 6 in a region of the drive motor.

FIG. 8 illustrates in enlarged partial view the configuration of electric motor 118 relative to worm drive transfer case 120 and drive shaft 38. A threaded bolt (or fastener) 39 is used to mount the free end of drive shaft 38 to a respective worm gear in transfer case 120 by threading bolt 39 into a complementary, threaded bore within the adjacent, free end of drive shaft 38. A perpendicular, intermeshing worm gear is affixed to a drive shaft of motor 118 to provide intermeshing engagement therebetween. Actuation of motor 118 imparts a concomitant counterclockwise rotation of drive shaft 38 to impart rotation of barrel 18 (see FIG. 6) in a clockwise direction, with the wheels atop shafts 38 and 40 supporting barrel 18 for rotation thereatop.

Figure 9:
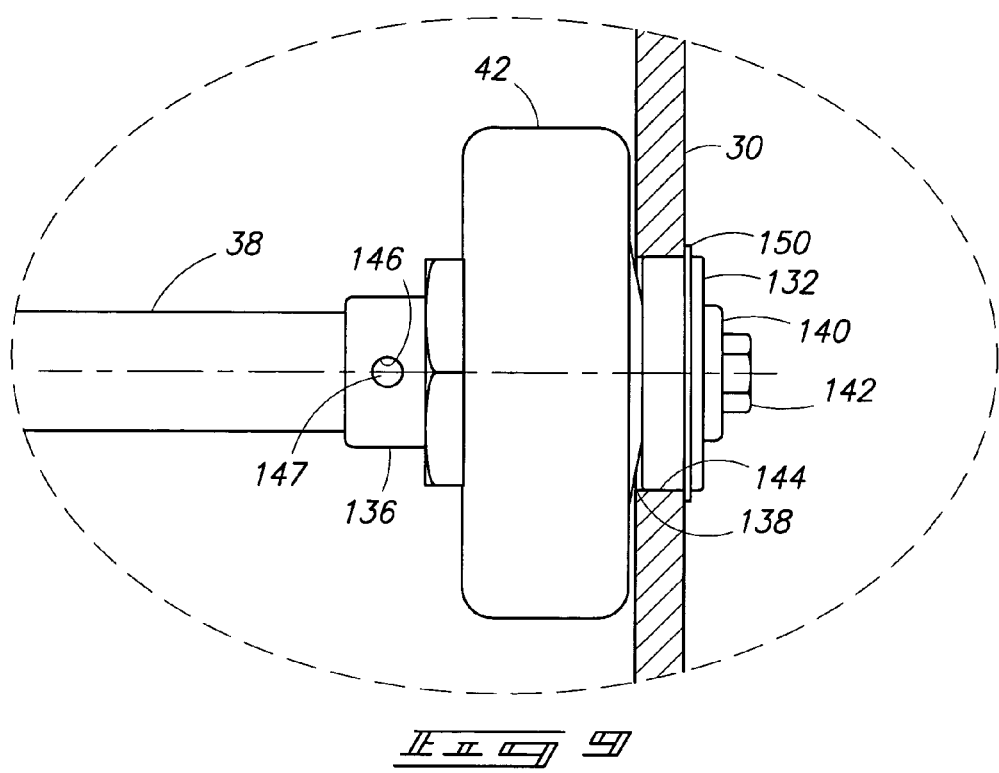
FIG. 9 is an enlarged partial view of a drive wheel on the drive shaft adjacent the entrance end of the article stacking device.
Figure 10:
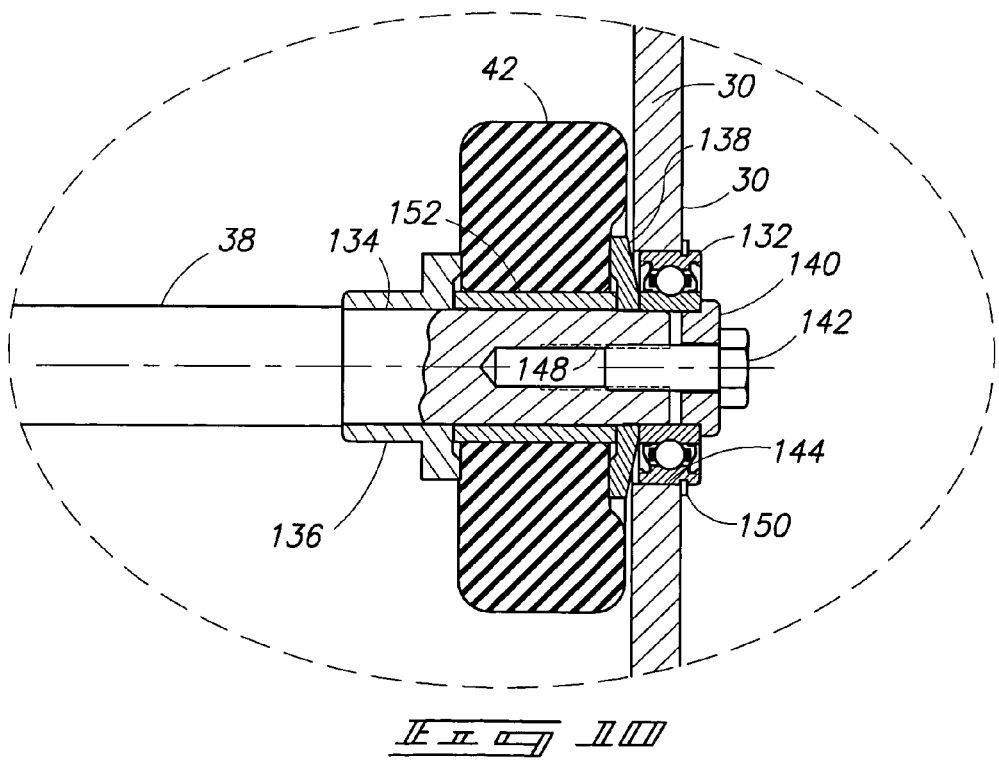
FIG. 10 is a partial vertical sectional view of the drive wheel and shaft of FIG. 9 illustrating construction and assembly of the wheel and shaft.

FIGS. 9 and 10 illustrate the mounting of a selected wheel 42 onto drive shaft 38, adjacent an entrance end of the barrel. More particularly, a ball bearing assembly 132 is fitted within a complementary-sized bore 144 provided through end plate 30. Bearing assembly 132 includes a circumferential groove that is formed in an outer surface of an outer bearing race which is sized to receive a retaining ring 150, as shown in FIG. 9. Ring 150 (and the respective groove) is positioned in assembly to be on the outside of end plate 30. A threaded fastener (or bolt) 142 secures bearing assembly 132 onto an end of drive shaft 38 using a bearing retainer 140. Retaining ring 150 prevents the outer race of bearing assembly 132 from passing through bore 144. By providing a ring 150 on each bearing at each end of the drive shaft and the idler shaft (and outside the respective end plate), the respective shaft is retained in the frame.

In order to axially and rotatably secure wheel 42 onto drive shaft 38, wheel 42 is compressed, in assembly, between a pair of collars 136 and 138. Collars 136 and 138 in assembly are compressed in engagement with opposite sides of wheel 42 so as to form a mounting hub for wheel 42 that axially and rotatably affixes wheel 42 relative to drive shaft 38. Accordingly, as drive shaft 38 is driven in rotation, wheel 42 is also driven in corresponding rotation to frictionally engage with the barrel and impart opposing rotation to the barrel. Additionally, collar 136 includes a cylindrical aperture 146 that aligns with a complementary aperture in drive shaft 38 (not shown) such that a pin 147 is inserted into aperture 146 and into the complementary aperture in drive shaft 38 to further lock collar 136 relative to drive shaft 38 to prevent relative rotation therebetween.

More particularly, FIG. 10 illustrates a reduced diameter shaft portion 134 that is provided on an end of drive shaft 38. Cylindrical collar 136 has an inner bore sized to mate about reduced diameter shaft 134. Collar 136 mates in abutment with a terminating end of the reduced diameter shaft 134 so as to axially locate collar 136, in assembly, along drive shaft 38. A cylindrical hub portion, or tube, 152 is then received over shaft portion 134, engaging with an adjacent end of collar 136. Cylindrical hub portion 152 has an inner diameter that complements the diameter of shaft portion 134 and a length that is sized to space apart collars 136 and 138, in compressive assembly, sufficiently to rigidly clamp wheel 42 between collars 136 and 138. Accordingly, the length of portion 152 is sized to generate a desired clamping force between collars 136 and 138, in assembly. Optionally, inner surfaces of collars 136 and 138 can be provided with radial indentations, or ribs, that further grip wheel 42 in order to prevent rotation of wheel 42 relative to shaft 38. Collar 136 also has a hexagonal outer diameter portion that further grips wheel 42 when placed in compressive assembly.

After assembling cylindrical hub portion 152 onto drive shaft 38, collar 138 is similarly received onto shaft 38. A free end of shaft 38 is then assembled within bore 144 in end plate 30, after which bearing assembly 132 and retaining ring 150 are then inserted within bore 144. Bearing retainer 140 is then seated against an inner race of bearing assembly 132, after which a threaded bolt (or fastener) 142 is engaged into complementary threaded bore 148 provided in the end of drive shaft 38. By tightening bolt 142 relative to threaded bore 148 a sufficient amount, bearing assembly 132 is retained within bore 144, while at the same time, collars 136 and 138 impart sufficient compressive force to clamp wheel 42 relative to drive shaft 38.

Although the construction of one particular wheel 42 has been depicted with reference to FIGS. 9 and 10, it is understood that the remaining wheel 42 at the downstream end of drive shaft 38 is similarly mounted, with the exception that drive shaft 38 extends completely through the respective bearing and a bevel gear is then entrapped on the other side of the bearing within the respective transfer case 120 (see FIG. 8). Even further similarly, the idler shaft 40 (see FIG. 5) includes a pair of wheels 42 where each wheel is mounted in a similar manner to that depicted in FIGS. 9 and 10.

Also according to the construction depicted in FIGS. 9 and 10, a gap is preferably provided between retaining ring 150 and an outer surface of end wall 30 in order to enable compressed assembly of collars 136 and 138 on either side of wheel 42, as bolt 142 is threaded into drive shaft 38. Assuming tolerances between associated components are accurately realized, upon assembly such gap between retaining ring 150 and end wall 30 can be minimized or nearly eliminated. However, it is also possible that a relatively large gap can be provided between retaining ring 150 and end wall 30.

Figure 11:
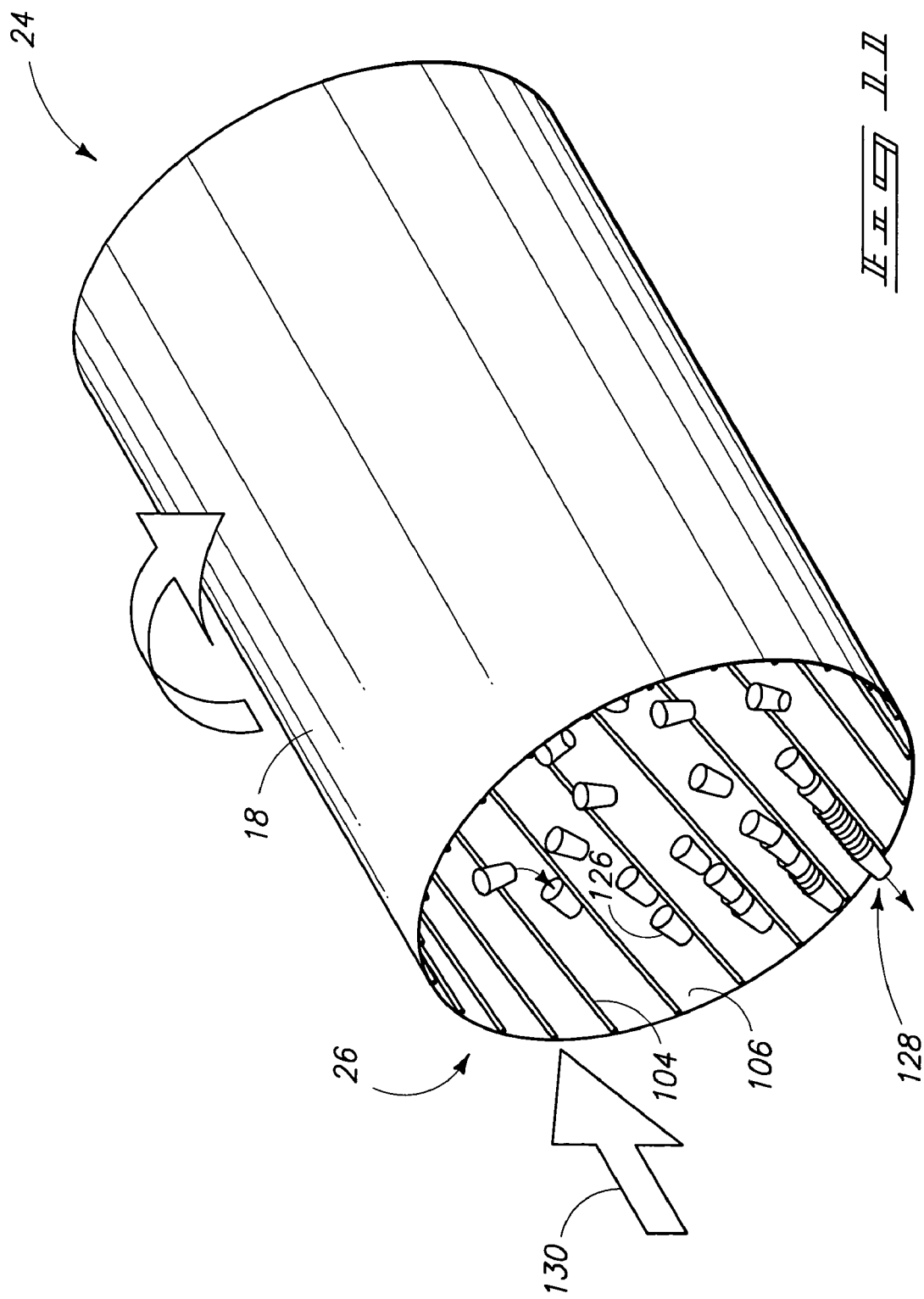
FIG. 11 is a simplified schematic view of the barrel for the article stacking device of FIG. 1-7 illustrating agitation of cups to encourage stacking of the cups, and conveyance of the stacked cups from the entrance end to the exit end, resulting from coaction of the cups and stacks of cups with a helically configured array of rods within the drum.

FIG. 11 illustrates in simplified schematic form the sorting and stacking features of the present invention. More particularly, barrel 18 is shown in simplified form being rotated so as to tumble and agitate articles 126 along inner surface 106 as such individual articles 126 roll on the inner surface 106 and engage rods 104. The helical configuration of rods 104 tends to agitate articles 126 in a manner that encourages nesting and stacking of such articles. Such nesting and stacking is further encouraged when the articles take the form of a tapered, cylindrical configuration having an open mouth portion, such as the shape of a typical plastic thermoformed cup. Accordingly, one form of such an article 126 comprises a thermoformed plastic cup. However, such stacking technique could also be applied to paper and foam cups, or other articles having a tapered configuration with an open mouth portion that renders the articles capable of being stacked in a nested array.

As individual articles 126 are realized in stacked configurations, such as stack 128, the stack becomes denser than the space occupied by an individual article 126. Although individual articles 126 in stack 128 migrate from the entrance end 24 towards the exit end 26 because of the helical configuration of rods 104, stream of air 130 tends to entrain and move the less dense unstacked or minimally stacked articles 126 from exit end 26 towards entrance end 24. In this manner, such unstacked or minimally stacked articles are further agitated by rods 104 and rolled within inner surface 106 to encourage further nesting into stacks 128.

Accordingly, it has been found through experimentation that an operator who is positioned at exit end 26 is typically presented with stacks 128 of articles 126 which can be readily and easily retrieved by hand via the operator for placement onto conveyor belt 60 (see FIGS. 1–3). Depending on the size of the articles and the barrel, rotational speed of the barrel can also be adjusted in order to optimize the speed with which articles are stacked.

Although the helical configuration of rods has been found to optimally encourage stacking of articles 126, other optional perturbations are understood as alternative constructions. For example, discrete radial inward projections can be provided on inner surface 106 that impart agitation to articles 126 as barrel 18 is rotated in a clockwise configuration, as depicted in FIG. 11, from exit end 26. Even further optionally, it has been found that the mere rotation of cylindrical inner surface 106 by rotation of barrel 18 causes tapered cup-shaped articles 126 to roll so that the bottom end becomes oriented in a downward direction relative to the open mouth top end portion. Such a configuration imparts sliding of the highest-most cups along surface 106 which tends to internest and stack the cups during such a rolling operation, even in the absence of any projection being provided along inner surface 106. However, an optimal efficiency appears to be realized utilizing the helical configuration of rods 104, schematically depicted in FIG. 11.

As a further optional implementation, a bin or container can be provided having a concave portion that increases in steepness at distances further away from the lowermost portion of the concave portion. By providing such a bin and concave portion in a recumbent position, then pivoting the bin back and forth, tapered cups (or articles) will tend to rotate in a line such that the bottom end of the cup become oriented directly below the open-mouthed top portion. As a highermost cup ascends the steeper surface, the highermost cup tends to slide in such orientation which encourages stacking together of adjacent cups. Accordingly, a bin can be pivoted back and forth to encourage the rolling presentment of such a concave portion. In one case, the concave portion comprises a semi-cylindrical surface that is pivoted about a central axis of the semi-cylindrical surface. By pivoting the surface back and forth, it has been found that stacking can be implemented. Furthermore, projections can be added to such a construction to further enhance agitation of stacking of the articles. Even furthermore, a helical configuration of rods can be provided in such a semi-cylindrical bin.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. An article stacking apparatus, comprising:
    a barrel having a plurality of rods affixed to an inner surface and extending in a helical array;
    a frame configured to support the barrel for rotation in a recumbent position;
    a motor; and
    a drive mechanism coupling together the frame and the motor to rotate the barrel to agitate articles within the barrel for stacking into accumulated configurations; and a pneumatic conveyor provided adjacent the exit end configured to deliver a stream of air toward the entrance end to urge individual, unstacked articles toward the entrance end;

wherein, responsive to rotation of the barrel, the helical array of rods interact with articles in the barrel to drive the accumulating articles from an entrance end to an exit end of the barrel.

2. The article stacking apparatus of claim 1 further comprising a plurality of rods provided on an inner surface of the barrel operative to agitate thermoformed open-mouth articles deposited within the barrel from a thermoforming operation to encourage stacking of the articles.

3. The article stacking apparatus of claim 2 wherein the drive mechanism is configured to rotate the barrel in one of a clockwise and a counterclockwise direction such that the helical array of rods drives the articles from an entrance end of the barrel and towards an exit end of the barrel.

4. The article stacking apparatus of claim 2 wherein the rods are provided in one of a right-hand helix and a left-hand helix, and the drum is rotated in one of a left-hand direction and a right-hand direction, respectively.

5. The article stacking apparatus of claim 1 wherein the pneumatic conveyor comprises a fan and an air duct configured to eject a stream of air in an upstream direction within the barrel.

6. The article stacking apparatus of claim 1 further comprising an entrance chute provided at the entrance end of the barrel.

7. The article stacking apparatus of claim 6 wherein the entrance chute slopes downwardly into the barrel.

8. The article stacking apparatus of claim 1 further comprising a stacked article conveyor provided adjacent the exit end of the barrel.

9. The article stacking apparatus of claim 1 wherein the frame supports the barrel for rotation about a horizontal axis.

10. A method for stacking open-mouthed articles, comprising:
providing a reclining barrel;
accumulating open-mouthed articles in the barrel;
rotating the barrel to manipulate orientation of the articles to stack the articles; and
providing a helical array of projections on an inner surface of the barrel, and moving the articles from an entrance end towards an exit end in response to the helical array of projections engaging the articles as the barrel rotates.

11. The method of claim 10 wherein the projections extend radially inward of an inner surface of the barrel, and agitating the articles by engaging the projections with the articles while rotating the drum.

12. The method of claim 10 wherein the barrel is supported along a horizontal axis.

13. The method of claim 10 further comprising providing a pneumatic conveyor adjacent an exit end of the barrel, and further comprising moving individual articles and relatively small stacks of articles from the exit end towards the entrance end of the barrel by directing a stream of air generated by the pneumatic conveyor against the articles.

14. A cup stacking device, comprising:
a barrel configured to support articles, the barrel including a drum carried for rotation and having an array of helical rods provided on an inner surface of the drum operative to agitate articles within the drum to encourage stacking of the articles, and further operative to drive the articles and stack of articles from an entrance end to an exit end of the drum;

a frame configured to support the barrel in a recumbent position for rotation of the concave portion;
a motor;
a drive mechanism coupling together the frame and the motor to rotate the barrel to manipulate orientation of the articles within the barrel to stack the articles;
an article conveyor communicating with an exit end of the barrel and operative to move stacks of articles retrieved from the exit end of the barrel; and
a pneumatic conveyor provided adjacent the exit end of the drum and configured to entrain and move individual articles from the exit end toward the entrance end for further agitating and stacking.

15. The cup stacking device of claim 14 wherein the barrel comprises a cylindrical drum, and the curved portion comprises an inner cylindrical surface of the drum.

16. The cup stacking device of claim 15 wherein the drum is rotated about a central axis of the drum.

17. The cup stacking device of claim 16 wherein the plurality of projections extend radially inwardly of the inner surface of the drum and are configured to interact with articles being tumbled in the drum to impart agitation of the articles and encourage nesting together of the articles into stacks.

18. The cup stacking device of claim 17 wherein each projection comprises a rod affixed to the inner surface of the drum.

19. The cup stacking device of claim 18 wherein the rod is configured in a helical configuration within the drum.

20. The cup stacking device of claim 19 wherein, responsive to rotation of the drum, the helical configuration of rods operate as impeller blades of an Archimedes screw to drive stacks of articles within the drum from an entrance end of the drum to an exit end of the drum.

21. The cup stacking device of claim 14 wherein the drum is recumbent with a horizontal, central axis.

22. A method for stacking articles, comprising:
providing a recumbent drum;
delivering stackable, open-mouthed articles into the drum; and
rotating the drum so as to present the articles along a rolling inner surface of the drum and facilitate stacking of the articles;
providing projections along an inner surface of the drum, and while rotating the drum, agitating the articles by impinging the articles against the projections to further facilitate stacking of the articles responsive at least in part to the agitation;
moving the articles from an entrance end toward an exit end of the drum at least in part by impinging the articles against the projections; and
generating a stream of air from the exit end toward the entrance end of the drum to encourage movement of individual articles and relatively small stacks of articles from the exit end toward the entrance end for further agitation and stacking.

23. The method of claim 22 wherein the projections comprise a helical array of rods affixed to the inner surface of the drum.

24. The method of claim 22 further comprising conveying stacks of the articles from the drum to a collection device.

25. The method of claim 22 further comprising agitating the articles while rotating the drum to further encourage stacking of the articles.

* * * * *